United States Patent
Zhou et al.

(10) Patent No.: US 10,547,392 B2
(45) Date of Patent: Jan. 28, 2020

(54) TERMINAL DEVICE, APPARATUS AND METHOD FOR TRANSMITTING AN IMAGE

(71) Applicant: BOE TECHNOLOGY GROUP CO., LTD., Beijing (CN)

(72) Inventors: Chengqi Zhou, Beijing (CN); Hong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 5 days.

(21) Appl. No.: 15/124,578

(22) PCT Filed: Sep. 16, 2015

(86) PCT No.: PCT/CN2015/089739
§ 371 (c)(1),
(2) Date: Sep. 8, 2016

(87) PCT Pub. No.: WO2016/183980
PCT Pub. Date: Nov. 24, 2016

(65) Prior Publication Data
US 2018/0091234 A1   Mar. 29, 2018

(30) Foreign Application Priority Data
May 19, 2015   (CN) .......................... 2015 1 0257491

(51) Int. Cl.
*H04B 11/00* (2006.01)
*G06K 9/46* (2006.01)
(Continued)

(52) U.S. Cl.
CPC ........... *H04B 11/00* (2013.01); *G06K 9/4652* (2013.01); *G06K 9/4661* (2013.01);
(Continued)

(58) Field of Classification Search
CPC ........ H04B 11/00; G06K 9/46; G06K 9/4661; G06K 9/4652; G10H 1/00; G10H 1/0008;
(Continued)

(56) References Cited

U.S. PATENT DOCUMENTS

| 2012/0084131 A1* | 4/2012 | Bergel | G06F 17/30876 705/14.26 |
| 2015/0141005 A1* | 5/2015 | Suryavanshi | H04L 67/125 455/434 |
| 2015/0222911 A1* | 8/2015 | Wang | H04N 1/00347 382/166 |

FOREIGN PATENT DOCUMENTS

| CN | 1287320 A | 3/2001 |
| CN | 1750118 A | 3/2006 |

(Continued)

OTHER PUBLICATIONS

Daniel White, YouTube; (https://www.youtube.com/watch?v=8BGr1u-Oz8M Aug. 31, 2012) SonicPhoto—What do pictures sound like. (Year: 2012).*

(Continued)

*Primary Examiner* — Isam A Alsomiri
*Assistant Examiner* — Amie M Ndure
(74) *Attorney, Agent, or Firm* — Armstrong Teasdale LLP (57) ABSTRACT

Embodiments of the present disclosure relate to a method and apparatus for transmitting an image. The method includes converting, by a first device, an image to be transmitted into a number of sets of feature data according to a preset conversion rule; performing, by the first device, music composition according to preset music composition rules to obtain a music in accordance with musical tone rules through making each set of the number of sets of feature data correspond to one musical element; and playing, by the first device, the music to a second device. An image transmission manner utilizing a sound wave that is hearable to the human ear may be implemented.

14 Claims, 3 Drawing Sheets

(51) Int. Cl.
*G10H 1/00* (2006.01)
*H04N 1/00* (2006.01)
*H04N 1/64* (2006.01)

(52) U.S. Cl.
CPC ....... *G10H 1/0008* (2013.01); *H04N 1/00095* (2013.01); *H04N 1/64* (2013.01); *G10H 2210/056* (2013.01); *G10H 2210/061* (2013.01); *G10H 2210/066* (2013.01)

(58) Field of Classification Search
CPC ....... G10H 2210/066; G10H 2210/061; G10H 2210/056; H04N 1/00; H04N 1/64; H04N 1/00095
See application file for complete search history.

(56) References Cited

FOREIGN PATENT DOCUMENTS

| | | |
|---|---|---|
| CN | 101409070 A | 4/2009 |
| CN | 102289778 A | 12/2011 |
| CN | 103928036 A | 7/2014 |
| TW | I292133 B | 1/2008 |
| WO | 2011136454 A1 | 11/2011 |

OTHER PUBLICATIONS

TEDxTalks; Matt Russo, YouTube; (https://www.youtube.com/watch?v=aLWrlNul2ac Jul. 5, 2018) Our Musical Universe | Matt Russo | TEDxUofT (Year: 2018).*
TEDxTalks; Matt Russo, YouTube; (https://www.cbc.ca/radio/quirks/an-astronomer-turns-the-motions-of-our-milky-way-galaxy-into-sweet-music-1.4762459 Jul. 27, 2018) an astronomer turns the motions of our Milky Way galaxy into sweet music. (Year: 2018).*
English translation of the International Search Report for International Patent Application No. PCT/CN2015/089739, dated Feb. 19, 2016 (5 pages).
English translation of the Written Opinion of the International Searching Authority for International Patent Application No. PCT/CN2015/089739, dated Feb. 19, 2016 (6 pages).
PCT/CN2015/089739, International Search Report, dated Feb. 19, 2016, 10 pp.
China First Office Action, Application No. 201510257491.2, dated Aug. 1, 2017, 25 pgs.: with English translation.

* cited by examiner

TERMINAL DEVICE, APPARATUS AND METHOD FOR TRANSMITTING AN IMAGE

CROSS REFERENCE TO RELATED APPLICATIONS

This application is a National Stage Entry of PCT/CN2015/089739, filed Sep. 16, 2015, which claims the benefit and priority of Chinese Patent Application No. 201510257491.2 filed May 19, 2015. The entire disclosure of each of the above applications is incorporated herein by reference.

BACKGROUND

Embodiments of the present disclosure relate to an apparatus and method for transmitting an image, as well as to a terminal device.

In the prior art, image transmissions between electronic devices are usually based on electromagnetic waves in a fixed waveband, such as Bluetooth, Wi-Fi and infrared transmissions, and so on. In addition, some products in the prior art may transmit data by sound waves, and the used audio signals are usually sound waves with very low or very high frequency. Although such sound waves are typically designed such that the human ear substantially cannot hear them, they may sometimes be perceived as a harsh or rustling sound, and may make people feel uncomfortable after a long time. In general, prolonged exposure under a scenario where a large amount of electromagnetic waves, ultrasound or infrasonic waves are used for communication damages humans to a certain degree, and for sound waves within a certain wave band hearable to the human ear, they are rarely used because they can directly impact on the human ear and can easily cause noise.

BRIEF DESCRIPTION

According to embodiments of the present disclosure, an image transmission manner of using sound waves hearable to the human ear to transmit an image can be realized.

According to a first aspect of the embodiments of the present disclosure, there is provided a method for transmitting an image, comprising:

converting, by a first device, an image to be transmitted into a number of sets of feature data according to a preset conversion rule;

performing, by the first device, music composition according to preset music composition rules to obtain a music in line with musical tone rules through making each set of the number of sets of feature data correspond to one musical element; and playing, by the first device, the music to a second device.

According to an embodiment of the present disclosure, the second device can extract the number of sets of feature data from musical elements of the music according to the preset music composition rules, and convert the number of sets of feature data into the image to be transmitted according to a rule corresponding to the preset conversion rule.

Alternatively, the musical elements of the music comprise at least one of:

a pitch sequence of sound having any one tone in the music;

a sequence consisting of length of each pitch in the pitch sequence of sound having any one tone in the music; and a sequence consisting of strength of each pitch in the pitch sequence of sound having any one tone in the music.

Alternatively, a data starting point and/or intermediate point and/or ending point of any set of the feature data are (is) identified by at least one preset sound feature in the music.

Alternatively, the at least one preset sound feature comprises at least one of: crescendo, decrescendo, non-chord tone, ornament, percussion sound, and a predetermined melody.

Alternatively, the step of performing, by the first device, music composition according to preset music composition rules through making each set of the number of sets of feature data correspond to one musical element of the music comprises:

converting a first set of feature data among the number of sets of feature data into a first data sequence according to a first preset rule among the preset music composition rules, each data in the first data sequence being a ternary number having preset digits;

converting a second set of feature data among the number of sets of feature data into a sound length sequence according to a second preset rule among the preset music composition rules;

making three digits of the ternary number respectively correspond to one of contrabass, bass and treble of a triad, and filling the first data sequence in combination with the sound length sequence as notes in a music score having preset chord progression in the preset music composition rules, according to a third preset rule among the preset music composition rules, to form a first melody of the music corresponding to a first preset tone in the preset music composition rules.

Alternatively, different feature data corresponding to the same ternary number are distinguished by respectively performing permutations and combinations of rise, fall or no-change on three notes corresponding to the ternary number in the music.

Alternatively, the step of performing, by the first device, music composition according to preset music composition rules through making each set of the number of sets of feature data correspond to one musical element of the music further comprises:

converting a third set of feature data among the number of sets of feature data into a sound intensity sequence according to a fourth preset rule among the preset music composition rules;

generating a second melody matching the first melody according to a fifth preset rule among the preset music composition rules, the sound intensity of each note in the second melody being set according to the sound intensity sequence, and the second melody corresponding to a second preset tone in the preset music composition rules.

Alternatively, the step of converting, by the first device, an image to be transmitted into a number of sets of feature data according to a preset conversion rule comprises:

converting a gray-scale value sequence of the image to be transmitted into a first set of feature data and a second set of feature data, the first set of feature data consisting of a first gray-scale value in the gray-scale value sequence and all of the gray-scale values different from the previous gray-scale value, the second set of feature data consisting of the number of consecutive appearance of each gray-scale value of the first set of feature data at the corresponding position in the gray-scale value sequence;

converting a chrominance value sequence of the image to be transmitted into a third set of feature data which is a chrominance value sequence of the image after size compression.

According to a second aspect of the embodiments of the present disclosure, there is provided a method for transmitting an image, comprising:

receiving, by a second device, a music played by a first device;

extracting, by the second device according to preset music composition rules, a number of sets of feature data from musical elements of the music in line with musical tone rules; and converting, by the second device, the number of sets of feature data into a corresponding image according to a rule corresponding to a preset conversion rule.

According to an embodiment of the present disclosure, the music is a music in line with, i.e., in accordance with, the musical tone rules which is obtained after the first device converts the image to be transmitted into the number of sets of feature data according to the preset conversion rule and performs music composition according to the preset music composition rules through making each set of the number of sets of feature data correspond to one musical element. Accordingly, the corresponding image obtained through the conversion by the second device corresponds to the image to be transmitted.

Alternatively, the musical elements of the music comprises at least one of:

a pitch sequence of sound having any one tone in the music;

a sequence consisting of length of each pitch in the pitch sequence of sound having any one tone in the music; and a sequence consisting of strength of each pitch in the pitch sequence of sound having any one tone in the music.

Alternatively, a data starting point and/or intermediate point and/or ending point of any set of the feature data are (is) identified by at least one preset sound feature in the music.

Alternatively, the at least one preset sound feature comprises at least one of: crescendo, decrescendo, non-chord tone, ornament, percussion sound, and a predetermined melody.

Alternatively, the step of extracting, by the second device according to preset music composition rules, a number of sets of feature data from musical elements of the music comprises:

extracting a first melody corresponding to a first preset tone from the music according to features of the first preset tone in the preset music composition rules;

obtaining a first data sequence and a sound length sequence from the tones in the first melody according to a third preset rule among the preset music composition rules, in combination with a music score having preset chord progression in the preset music composition rules, each data in the first data sequence being a ternary number having preset digits, and three digits of the ternary number respectively corresponding to one of contrabass, bass and treble of a triad;

converting the first data sequence into a first set of feature data among the number of sets of feature data according to a first preset rule among the preset music composition rules, and converting the sound length sequence into a second set of feature data among the number of sets of feature data according to a second preset rule among the preset music composition rules.

Alternatively, different feature data corresponding to the same ternary number are distinguished by respectively performing permutations and combinations of rise, fall or no-change on three notes corresponding to the ternary number in the music.

Alternatively, the step of extracting, by the second device, the number of sets of feature data from the musical elements of the music according to the preset music composition rules further comprises:

extracting a second melody corresponding to a second preset tone from the music according to features of the second preset tone in the preset music composition rules, the second melody matching the first melody;

extracting a sound intensity sequence from the sound intensity of each note in the second melody according to a fifth preset rule in the preset music composition rules;

converting the sound intensity sequence into a third set of feature data among the number of sets of feature data according to a fourth preset rule among the preset music composition rules.

Alternatively, the step of converting, by the second device, the number of sets of feature data into the corresponding image according to a rule corresponding to the preset conversion rule comprises:

converting a first set of feature data and a second set of feature data among the number of sets of feature data into a gray-scale value sequence of the corresponding image, the first set of feature data consisting of a first gray-scale value in the gray-scale value sequence and all of the gray-scale values different from the previous gray-scale value, the second set of feature data consisting of the number of consecutive appearance of each gray-scale value of the first set of feature data at the corresponding position in the gray-scale value sequence;

converting a third set of feature data among the number of sets of feature data into a chrominance value sequence of the corresponding image, the third set of feature data being a chrominance value sequence of the image after size compression.

According to a third aspect of the embodiments of the present disclosure, there is provided an apparatus for transmitting an image, comprising:

a conversion module for converting an image to be transmitted into a number of sets of feature data according to a preset conversion rule;

a music composition module for performing music composition according to preset music composition rules to obtain a music in line with musical tone rules through making each set of the number of sets of feature data obtained by the conversion module correspond to one musical element; and a playing module for playing the music obtained by the music composition module to a second device.

Alternatively, the musical elements of the music comprise at least one of:

a pitch sequence of sound having any one tone in the music;

a sequence consisting of length of each pitch in the pitch sequence of sound having any one tone in the music;

a sequence consisting of strength of each pitch in the pitch sequence of sound having any one tone in the music.

Alternatively, a data starting point and/or intermediate point and/or ending point of any set of the feature data are (is) identified by at least one preset sound feature in the music.

Alternatively, the at least one preset sound feature comprises at least one of: crescendo, decrescendo, non-chord tone, ornament, percussion sound, and a predetermined melody.

Alternatively, the music composition module comprises:

a first conversion unit for converting a first set of feature data among the number of sets of feature data obtained by the conversion module into a first data sequence according to a first preset rule among the preset music composition rules, each data in the first data sequence being a ternary number having preset digits;

a second conversion unit for converting a second set of feature data among the number of sets of feature data obtained by the conversion module into a sound length sequence according to a second preset rule among the preset music composition rules;

a music composition unit for making three digits of the ternary number respectively correspond to one of contrabass, bass and treble of a triad, and filling the first data sequence obtained by the first conversion unit in combination with the sound length sequence obtained by the second conversion unit as notes in a music score having preset chord progression in the preset music composition rules, according to a third preset rule among the preset music composition rules, to form a first melody corresponding to a first preset tone in the preset music composition rules.

Alternatively, different feature data corresponding to the same ternary number are distinguished by respectively performing permutations and combinations of rise, fall or no-change on three notes corresponding to the ternary number in the music.

Alternatively, the music composition module further comprises:

a third conversion unit for converting a third set of feature data among the number of sets of feature data obtained by the conversion module into a sound intensity sequence according to a fourth preset rule among the preset music composition rules;

a generating unit for generating a second melody matching the first melody according to a fifth preset rule among the preset music composition rules, the sound intensity of each note in the second melody being set according to the sound intensity sequence obtained by the third conversion unit, and the second melody corresponding to a second preset tone in the preset music composition rules.

Alternatively, the conversion module comprises:

a fourth conversion unit for converting a gray-scale value sequence of the image to be transmitted into a first set of feature data and a second set of feature data, the first set of feature data consisting of a first gray-scale value in the gray-scale value sequence and all of the gray-scale values different from the previous gray-scale value, the second set of feature data consisting of the number of consecutive appearance of each gray-scale value of the first set of feature data at the corresponding position in the gray-scale value sequence;

a fifth conversion unit for converting the chrominance value sequence of the image to be transmitted into a third set of feature data which is a chrominance value sequence of the image after size compression.

According to a fourth aspect of the embodiments of the present disclosure, there is provided an apparatus for transmitting an image, comprising:

a receiving module for receiving a music played by a first device;

an extraction module for extracting, according to preset music composition rules, a number of sets of feature data from musical elements of the music in line with musical tone rules which is obtained by the receiving module;

a conversion module for converting the number of sets of feature data obtained by the extraction module into the corresponding image according to a rule corresponding to a preset conversion rule.

Alternatively, the musical elements of the music comprise at least one of:

a pitch sequence of sound having any one tone in the music;

a sequence consisting of length of each pitch in the pitch sequence of sound having any one tone in the music;

a sequence consisting of strength of each pitch in the pitch sequence of sound having any one tone in the music.

Alternatively, a data starting point and/or intermediate point and/or ending point of any set of the feature data are (is) identified by at least one preset sound feature in the music.

Alternatively, the at least one preset sound feature comprises at least one of: crescendo, decrescendo, non-chord tone, ornament, percussion sound, and a predetermined melody.

Alternatively, the extraction module comprises:

a first extraction unit for extracting a first melody corresponding to a first preset tone from the music obtained by the receiving module according to features of the first preset tone in the preset music composition rules;

an obtaining unit for obtaining a first data sequence and a sound length sequence from tones in the first melody obtained by the first extraction unit according to a third preset rule among the preset music composition rules, in combination with the music score having preset chord progression in the preset music composition rules, each data in the first data sequence being a ternary number having preset digits, and three digits of the ternary number respectively corresponding to one of contrabass, bass and treble of a triad;

a first conversion unit for converting the first data sequence obtained by the obtaining unit into a first set of feature data among the number of sets of feature data according to a first preset rule among the preset music composition rules, and converting the sound length sequence obtained by the obtaining unit into a second set of feature data among the number of sets of feature data according to a second preset rule among the preset music composition rules.

Alternatively, different feature data corresponding to the same ternary number are distinguished by respectively performing permutations and combinations of rise, fall or no-change on three notes corresponding to the ternary number in the music.

Alternatively, the extraction module further comprises:

a second extraction unit for extracting a second melody corresponding to a second preset tone from the music obtained by the receiving module according to features of the second preset tone in the preset music composition rules, the second melody matching the first melody;

a third extraction unit for extracting a sound intensity sequence from the sound intensity of each note in the second melody obtained by the second extraction unit according to a fifth preset rule among the preset music composition rules;

a second conversion unit for converting the sound intensity sequence obtained by the third extraction unit into a third set of feature data among the number of sets of feature data according to a fourth preset rule among the preset music composition rules.

Alternatively, the conversion module comprises:

a third conversion unit for converting the first set of feature data and the second set of feature data among the number of sets of feature data obtained by the extraction module into a gray-scale value sequence of the corresponding image, the first set of feature data consisting of a first gray-scale value in the gray-scale value sequence and all of the gray-scale values different from the previous gray-scale value, the second set of feature data consisting of the number of consecutive appearance of each gray-scale value of the first set of feature data at the corresponding position in the gray-scale value sequence;

a fourth conversion unit for converting the third set of feature data among the number of sets of feature data obtained by the extraction module into a chrominance value sequence of the corresponding image, the third set of feature data being a chrominance value sequence of the image after size compression.

According to a fifth aspect of the embodiment of the present disclosure, there is provided a terminal device, comprising:

any of the abovementioned apparatus for transmitting an image, which may play the music to the second device, and/or, any of the abovementioned apparatus for transmitting an image, which may receive the music played by the first device.

The embodiments abovementioned can implement the image transmission between the first and second devices by playing and listening to the music, whereby not only users may intuitively feel the entire transmission process, but also a variety of different aesthetic music can be generated according to different images transmitted. This is very practical for scenarios not demanding high data speed, such as entertainment, education, advertisement and other specific scenarios.

BRIEF DESCRIPTION OF THE DRAWINGS

To more clearly illustrate the embodiments of the present disclosure, drawings accompanying the embodiments will be briefly described below. Apparently, the drawings in the following description merely relate to some embodiments of the present disclosure, but are not meant to limit the present disclosure in any way. Those of ordinary skill in this art may also obtain other embodiments according to these drawings, without creative work.

DETAILED DESCRIPTION

To make the embodiments of the present disclosure clearer, the embodiments of the present disclosure will be described below clearly and comprehensively in combination with drawings accompanying the embodiments of the present disclosure. Obviously, the embodiments described are merely part of, instead of all of the embodiments of the present disclosure. Based on the embodiments of the present disclosure, all the other embodiments obtained by those of ordinary skill in the art without creative work will fall within the scope sought for protection by the present disclosure.

In the description of the present disclosure it should be noted that the orientation or positional relationship indicated by the term "upper" or "lower" is the orientation or positional relationship based on the drawings, merely for facilitating and simplifying the description of the present disclosure, rather than indicating or implying that the device or element referred to must have a particular orientation or be constructed and operated in a particular orientation, and hence cannot be construed as limiting the present disclosure. Unless otherwise clearly defined and limited, the terms "mounted," "connected," "attached" should be broadly understood, for example, which may refer to such scenarios as fixedly connected, removably connected or integrally connected; mechanically connected, or electrically connected; directly connected, or connected indirectly through intermediate media, or two elements with internal connectivity. Those of ordinary skill in the art may understand the specific meaning of the above-mentioned terms in the present disclosure depending on specific circumstances.

Further, in the description of the embodiments of the disclosure, unless otherwise indicated, "a number of" means one or more.

Figure 1:
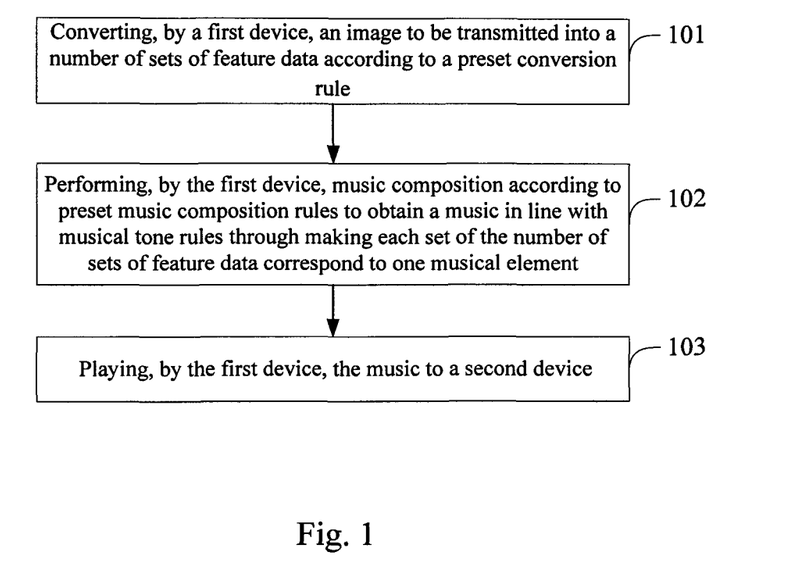
FIG. 1 is a schematic view of process steps of a method for transmitting an image in an embodiment of the present disclosure.

FIG. 1 is a schematic view of process steps of a method for transmitting an image in an embodiment of the present disclosure. Referring to FIG. 1, the method comprises:

Step 101: converting, by a first device, an image to be transmitted into a number of sets of feature data according to a preset conversion rule;

Step 102: performing, by the first device, music composition according to preset music composition rules to obtain a music in line with, i.e., in accordance with, musical tone rules through making each set of the number of sets of feature data correspond to one musical element;

Step 103: playing, by the first device, the music to a second device.

It should be noted that the first and second devices refer to transmitting and receiving devices for an image to be transmitted, respectively. The second device can extract the number of sets of feature data from the musical elements of the music according to the preset music composition rules, and convert the number of sets of feature data into the image to be transmitted according to a rule corresponding to the preset conversion rule. It is noted that, if the preset conversion rule is understood as a rule for converting an image into a number of sets of feature data, then the rule corresponding to the preset conversion rule may be understood as a rule for converting the number of sets of feature data into the image. Before step 101, the image to be transmitted may be stored in the first device in any format. It should be understood that the number of sets of feature data in step 101 should have a data format specified in the preset conversion rule, for example, the order of each set of feature data should be determined, and have explicit starting and ending points. It should also be appreciated that, the above-described preset conversion rule may comprise all the information necessary for mutual conversion (lossy conversion or lossless conversion) between the image to be transmitted and the number of sets of feature data, and at least comprise the corresponding relationship between the image to be transmitted and the number of sets of feature data. Accordingly, after specifying the format of the image to be transmitted and the format of the number of sets of feature data in the preset conversion rule, those skilled in the art may implement the conversion from the image to be transmitted to the number of sets of feature data using a plurality of ways in combination with the prior art, for example, converting a bitmap image, after any one or more of compression, noise reduction, sampling, segmentation, into a set of luminance value data and two sets of chrominance value data, and the present disclosure has no limitation thereto.

In step 102 abovementioned, the musical elements specifically refer to various elements forming the music, such as, pitch of sound, length of sound, strength of sound, tone, rhythm, melody, harmony, intensity, speed, mode, form, texture etc., or a combination of any thereof. The music composition process in step 102 is performed according to the preset music composition rules, that is, the preset music composition rules give at least a correspondence between each set of feature data and each musical element, as well as a correspondence between each feature data and one element in the music. Moreover, the preset music composition rules should comprise all the information necessary for mutual conversion (lossy conversion or lossless conversion) between the number of sets of feature data and the music. It will be appreciated that, it is allowed in the music that any number of elements do not correspond to any one feature data, whereby this part of the elements can be appropriately set according to the musical tone rules in combination with the preset music composition rules, so that the obtained music can be in line with the musical tone rules as far as possible.

It should also be appreciated that, since in step 103 it is needed to implement the conversion from the music at the second device to the image to be transmitted, the second device need to use the same preset music composition rules as those used by the first device in the transmission process, and to use the rule corresponding to the preset conversion rule as used by the first device to perform the conversion from the number of sets of feature data to the image. Overall, the above method is equivalent to the first device encoding the image into the music and then the second device decoding the music into the image, whereby the various operations and rules in embodiments of the present disclosure are required to be in compliance with the corresponding communication principles, which are readily inferred by those skilled in the art in combination with the prior art and will not be repeated herein again.

It can be seen from the above that, in the embodiments of the disclosure, the image transmission between the first and second devices can be implemented by playing and listening to the music, whereby not only users may intuitively feel the entire transmission process, but also a variety of different aesthetic music can be generated according to different images transmitted. This is very practical for scenarios not demanding high data speed, such as entertainment, education, advertisement and other specific scenarios.

Figure 2:
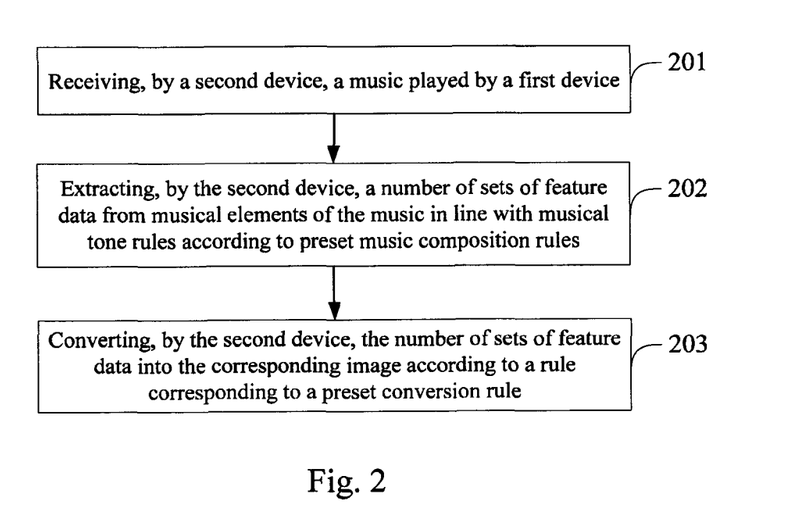
FIG. 2 is a schematic view of process steps of a method for transmitting an image in another embodiment of the present disclosure.

FIG. 2 is a schematic view of process steps of a method for transmitting an image in another embodiment of the present disclosure. Referring to FIG. 2, the method comprises:

Step 201: receiving, by a second device, a music played by a first device, the music being the music in line with musical tone rules obtained after the first device converts an image to be transmitted into a number of sets of feature data according to a preset conversion rule and performs music composition according to preset music composition rules through making each set of the number of sets of feature data correspond to one musical element;

Step 202: extracting, by the second device, the number of sets of feature data from musical elements of the music according to the preset music composition rules;

Step 203: converting, by the second device, the number of sets of feature data into the image to be transmitted according to a rule corresponding to the preset conversion rule.

It will be appreciated that, steps 201, 202 and 203 in the method for transmitting an image in the embodiment of the present disclosure correspond to steps 103, 102 and 101 in FIG. 1, respectively, and are not described again here. Similarly, in the embodiment of the disclosure, the image transmission between the first and second devices can be implemented by playing and listening to the music, whereby not only users may intuitively feel the entire transmission process, but also a variety of different aesthetic music can be generated according to different images transmitted. This is very practical for scenarios not demanding high data speed, such as entertainment, education, advertisement and other specific scenarios.

In the process steps shown in FIG. 1 and in the process steps shown in FIG. 2, the utilized musical elements may comprise at least one of:

a pitch sequence of sound having any one tone in the music;

a sequence consisting of length of each pitch in the pitch sequence of sound having any one tone in the music;

a sequence consisting of strength of each pitch in the pitch sequence of sound having any one tone in the music.

For example, in a melody part in the music played by a piano, the pitch sequence of notes may correspond to a set of feature data, the sound length sequence of notes may correspond to another set of feature data, and the sound intensity sequence of notes may correspond to a further set of feature data. Again, in a melody part in the music played by a guitar, the combination of the pitch sequence of the former half of the notes and the sound length sequence of the latter half of the notes may correspond to a set of feature data, and the combination of the sound intensity sequence of the former half of the notes and the pitch sequence of the latter half of the notes may correspond to another set of feature data. Thus, the modulation and demodulation of relatively independent pitch, length or intensity of sound of different tones can be implemented conveniently in combination with the prior art, thereby making the music composition of a music more flexible while effectively ensuring the transmission reliability at the same time.

In the process steps shown in FIG. 1 and in the process steps shown in FIG. 2, a data starting point and/or intermediate point and/or ending point of any set of feature data are (is) identified by at least one preset sound feature in the music. Where the preset sound feature may be a separate segment of special sound, and also may be some change features of the notes. For example, the at least one preset sound feature abovementioned comprise at least one of: crescendo, decrescendo, non-chord tone, ornament, percussion sound, and a predetermined melody. For example, a crescendo can be used as an identification of a data starting point of a set of feature data, and the appearance of a predetermined melody can be used as an identification of a data ending point thereof (of course, this predetermined melody should not interfere with musical elements corresponding to the number of sets of feature data). Based on this, the reliability of image transmission can be guaranteed. Similarly, the transmission of a variety of communication signaling may be implemented using a variety of preset elements or a combination thereof in the music, and the present disclosure has no limitation thereto.

Figure 3:
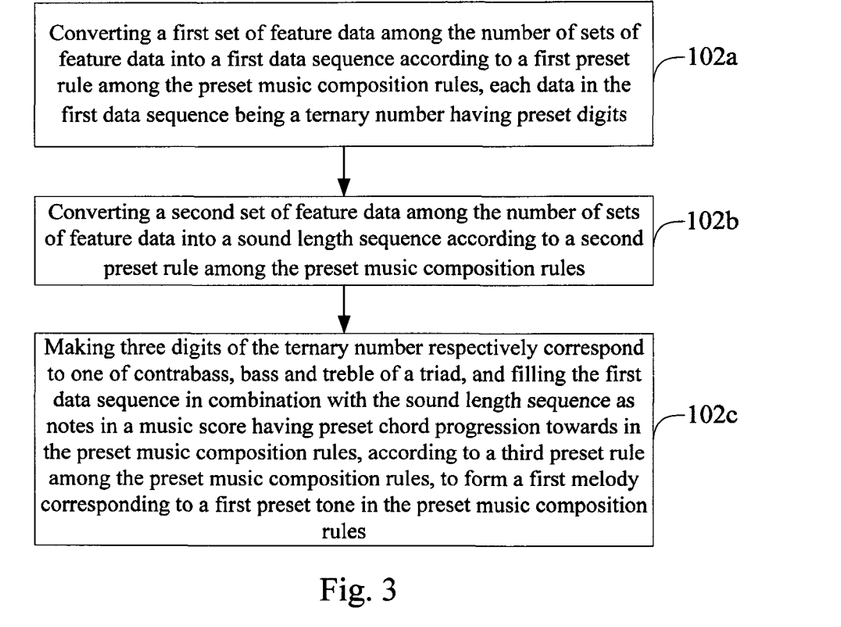
FIG. 3 is a schematic view of process steps of performing music composition according to preset music composition rules in an embodiment of the present disclosure.

On the basis of the process steps shown in FIG. 1, the step 102 of performing, by the first device, music composition according to preset music composition rules through making each set of the number of sets of feature data correspond to one musical element in the music may specifically comprise the following process steps as shown in FIG. 3:

Step 102a: converting a first set of feature data among the number of sets of feature data into a first data sequence according to a first preset rule among the preset music composition rules, each data in the first data sequence being a ternary number having preset digits;

Step 102b: converting a second set of feature data among the number of sets of feature data into a sound length sequence according to a second preset rule among the preset music composition rules;

Step 102c: making three digits of the ternary number respectively correspond to one of contrabass, bass and treble of a triad, and filling the first data sequence in combination with the sound length sequence as notes in a music score having preset chord progression in the preset music composition rules, according to a third preset rule among the preset music composition rules, to form a first melody of the music corresponding to a first preset tone in the preset music composition rules.

Figure 4:
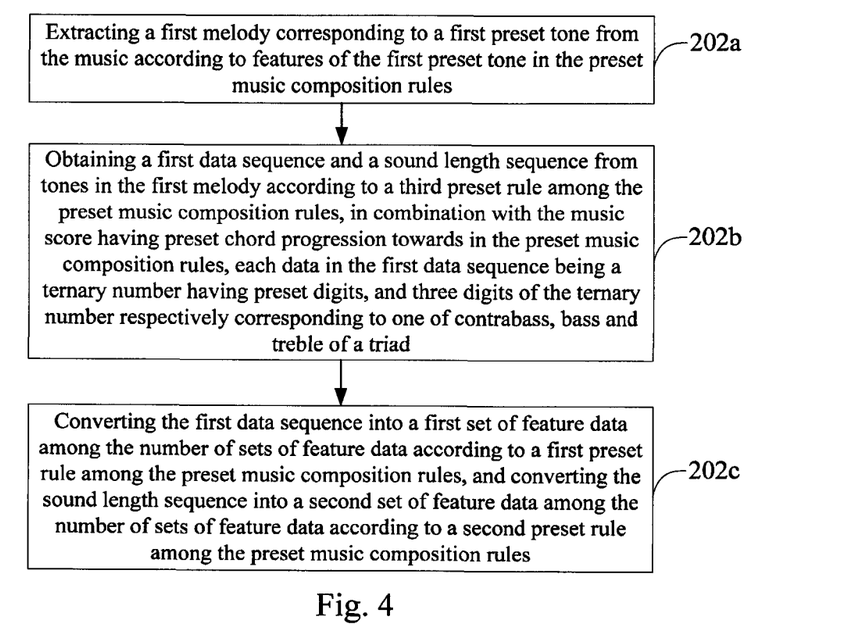
FIG. 4 is a schematic view of process steps of extracting a number of sets of feature data from a music in an embodiment of the present disclosure.

Accordingly, on the basis of the process steps shown in FIG. 2, the step 202 of extracting, by the second device, the number of sets of feature data from musical elements of the music according to the preset music composition rules may specifically comprise the following steps shown in FIG. 4:

Step 202a: extracting the first melody corresponding to a first preset tone from the music according to features of the first preset tone in the preset music composition rules;

Step 202b: obtaining a first data sequence and the sound length sequence from the tones in the first melody according to a third preset rule among the preset music composition rules, in combination with the music score having preset chord progression in the preset music composition rules, each data in the first data sequence being a ternary number having preset digits, and three digits of the ternary number respectively corresponding to one of contrabass, bass and treble of a triad, Step 202c: converting the first data sequence into a first set of feature data among the number of sets of feature data according to a first preset rule among the preset music composition rules, and converting the sound length sequence into a second set of feature data among the number of sets of feature data according to a second preset rule among the preset music composition rules.

For example, the music score having preset chord progression in the preset music composition rules may be as shown in Table 1 below:

TABLE 1

An Exemplary Music Score Having Preset Chord Progression

| No. | First Section | Second Section | Third Section | ... | Ending Section |
|---|---|---|---|---|---|
| Chord | Am | G | Dm | ... | Am |

Where, Am, G, Dm are mark symbols of a triad, for example, an Am chord is a minor triad composed of three tones overlapping, la, do, mi (marked as 6, 1, 3 in numbered musical notation). By way of example of a number of consecutive sections of an Am chord set in the music, the process steps 102a to 102c are specifically illustrated below.

In the above-described step 102a, assuming a first set of feature data at positions of the number of consecutive sections comprises four gray-scale value data 121, 71, 81, 1, ranging from 1 to 256, a conversion rule from the first set of feature data to the first data sequence may be specified in the first preset rule: first, each digit of the ternary number comprises 0, A, B from small to large; second, 1 to 256 are evenly divided into 26 sets from small to large, each set comprising up to 10 gray-scale values and each set respectively corresponding to 26 three-digit ternary numbers from small to large: 000, 00A, 00B, 0A0, 0AA, 0AB, . . . , BB0, BBA.

Of course, the first preset rule may also comprise other content depending on the specific application scenario, as the same as other preset rules in this article.

Specifically, as shown in the following Table 2:

TABLE 2

Correspondence between Gray-Scale Value and Ternary Number

| | Gray-Scale Value | | | | |
|---|---|---|---|---|---|
| | 1~10 | 11~20 | 21~30 | ... | 231~250 | 251~256 |
| Ternary Number | 000 | 00A | 00B | ... | BB0 | BBA |

Thus, the four gray-scale value data abovementioned 121, 71, 81, 1 can be converted into four ternary numbers AA0, 0BA, 0BB, 000 according to the first preset rule.

In the above-described step 102b, assuming a second set of feature data at positions of the number of consecutive sections comprises four gray-scale value data 1, 32, 63, 15, ranging from 1 to 64, a conversion rule may be specified in the second preset rule: first, each data corresponds to a three-digit quaternary number, each digit being 0, a, b, c from small to large, and data 1 to 64 respectively correspond to quaternary numbers 000~ccc; second, 0, a, b, c respectively correspond to ¼ note length, ½ note length, ¾ note length and a full note. Thus, the above four data 1, 32, 63, 15 can be converted into four three-digit quaternary numbers, 000, acc, ccb, 0cb, according to the second preset rule, and a sound length sequence composed of 12 note lengths can be obtained according to such correspondence.

In the above-described step 102c, it can be specified in the first preset rule: first, 0, A, B from small to large in each digit in the ternary number respectively correspond to contrabass, bass, treble in a triad, and are specifically do, mi, la (i.e. 1, 3, 6) in an Am chord; second, the numerical order of each digit in the ternary number is converted into the pitch of a note, and sequentially in combination with the sound length sequence obtained through the conversion of the second set of feature data is filled as notes in the music score having preset chord progression; third, when the sum of note length of a section does not comply with the rules, rests are filled.

Thus, the pitch sequence of the numbered musical notation corresponding to the above four ternary numbers AA0, 0BA, 0BB, 000 is: 331, 163, 166, 111, and can be filled in combination with the sound length sequence 000, acc, ccb, 0cb in a number of consecutive sections of a set Am chord specifically as the first melody shown below (assuming the music score is a 4/4 numbered musical notation):

| 3 3 1 0 |1 - 0 0 | 6 - - - | 3 - - - |
|1 - - - | 6 - - - | 6 - - 1 |1 - - - |
|1 - - 0 |

As can be seen, the pitch sequence in this part of the music may represent the first set of feature data, and the length sequence may represent the second set of feature data. Of course, this part of the music may be modified, such as adding legato lines, adding ornaments for part of the notes, and so on; and on this basis, other elements may be added in the music to fit this melody, such as setting a suitable first preset tone, adding a chord melody having another tone, adding the cooperation of percussion and so on.

Corresponding to the process steps 102a to 102c, the above steps 202a to 202c may specifically comprise the following process steps.

In the step 202a, since the second device also stores the same preset music composition rules, it is possible to find the number of consecutive sections set as an Am chord from the music score having preset chord progression, whereby it is possible to find the position of the first melody in the music. Moreover, since the first melody has a first preset tone in the preset music composition rules, the first melody can be extracted from this part of the music.

In the step 202b, according to the third preset rule, the second device may obtain the pitch sequence of the first melody according to frequency features of notes in combination with the first preset tone, and the length sequence of the first melody can be obtained by sampling the note duration. Further, based on the first preset rule, the first data sequence consisting of three-digit ternary numbers may be obtained through the conversion of the pitch sequence.

In the step 202c, it is possible to obtain the numerical interval to which each feature data in the first set of feature data belongs according to the first data sequence (e.g., it is obtained through the lookup in Table 2 that the feature data corresponding to the ternary number 00B is within the numerical interval from 21 to 30). In an application scenario allowing lossy transmission, the feature data can be estimated directly (such as obtaining an average or a random value) according to the numerical interval to which the feature data belong, thereby obtaining the first set of feature data after transmission. On the other hand, a sequence consisting of a plurality of three-digit quaternary numbers can be obtained from the sound length sequence according to the second preset rule, and hence is converted to obtain the second set of feature data.

Since then, the embodiments of the disclosure may transmit the first set of feature data and the second set of feature data in the sound of one tone in the music through the sound intensity sequence and the length sequence, respectively. Based on the above examples, the method may further implement the parallel transmission with higher efficiency.

It should be noted that the data in the first set of feature data do not necessarily correspond to the data in the second set of feature data one to one. For example, when the transmission of the pitch sequence has been completed while the transmission of the sound length sequence has not yet been completed, the sound length sequence may be transmitted by employing a note combination corresponding to the ternary number "BBB", or the sound length sequence may be transmitted by repeating the previous melody that has appeared, and the like; for another example, when the transmission of the sound length sequence has been completed while the transmission of the pitch sequence has not yet been completed, the length of each note may be automatically set by employing an appropriate rule. Of course, these settings need to be recorded in the preset music composition rules.

In another embodiment of the present disclosure, different feature data corresponding to the same ternary number may be distinguished by respectively performing permutations and combinations of rise, fall or no-change on three notes corresponding to the ternary number in the music.

For example, in the first preset rule, "rise" on a note may be specified as "3% increase in the frequency", "fall" on a note may be specified as "5% decrease in the frequency". Thus, in a marked scene having "rise" on a note as "#", "fall" on a note as "b", and "no-change" on a note as "~", the specific values within each set among the 26 sets may be represented by permutations and combinations of rise, fall or no-change on notes, as shown in Table 3 below:

TABLE 3

Correspondence between Values within Sets and Permutations and Combinations of Rise and Fall on Notes

| | Single Digit of Feature Data | | | | | | | | | |
|---|---|---|---|---|---|---|---|---|---|---|
| | 0 | 1 | 2 | 3 | 4 | 5 | 6 | 7 | 8 | 9 |
| Permutations and Combinations of Rise and Fall on Notes | ~bb | bbb | bb~ | bb# | b~b | b~~ | b~# | b#b | b#~ | b## |

For example, when the feature data "23" in the above step 102a is converted into a ternary number "00B", it may be obtained according to Table 3 at the same time that the corresponding permutation and combination of rise and fall on notes is "b ~~", and therefore in the notes "116" corresponding to "00B", the first note "1" is brought fall while playing (5% decrease in the frequency), while the second note "1" and the third note "6" are not changed in frequency while playing. Thus, in the process steps 202a to 202c, it may be obtained that the permutation and combination of rise and fall on notes corresponding to the ternary number "00B" is "b~~" by detecting the rise and fall of each note, and then it may be determined in the numerical interval from 21 to 30 to which the feature data belong through Table 3 that the feature data is "23".

On this basis, the embodiments of the disclosure may implement lossless transmission of the first set of feature data.

On the other hand, on the basis of the process steps shown in FIG. 1, the step 102 of performing, by the first device, music composition according to preset music composition rules through making each set of the number of sets of feature data correspond to one musical element in the music may further comprise the following process steps not shown in the drawings:

Step 102d: converting a third set of feature data among the number of sets of feature data into a sound intensity sequence according to a fourth preset rule among the preset music composition rules;

Step 102e: generating a second melody matching the first melody according to a fifth preset rule among the preset music composition rules, the sound intensity of each note in the second melody being set according to the sound intensity sequence, and the second melody corresponding to a second preset tone in the preset music composition rules.

Accordingly, on the basis of the process steps shown in FIG. 2, the step 202 of extracting, by the second device, the number of sets of feature data from musical elements of the music according to the preset music composition rules may further comprise the following process steps not shown in the drawings:

Step 202d: extracting a second melody corresponding to the second preset tone from the music according to features of a second preset tone in the preset music composition rules, the second melody matching the first melody;

Step 202e: extracting a sound intensity sequence from the sound intensity of each note in the second melody according to a fifth preset rule in the preset music composition rules;

Step 202f: converting the sound intensity sequence into a third set of feature data among the number of sets of feature data according to a fourth preset rule among the preset music composition rules.

For example, the fourth preset rule used in the step 102d may specify the one-to-one correspondence between the data in the third set of feature data and the sound intensity, so that in the step 102e the second melody matching the first melody and having the second preset tone may be modulated through the sound intensity sequence according to the fifth preset rule. Correspondingly, the second melody may be extracted in the step 202d in a way similar to the first melody, and the sound intensity sequence may be extracted in the step 202e by means of sampling signal amplitude according to the fifth preset rule. Finally, the sound intensity sequence may be converted into the third set of feature data in the number of sets of feature data using the one-to-one correspondence between the data in the third set of feature data and the sound intensity according to the fourth preset rule in the step 202f. The embodiment of the present disclosure may use the second melody to add aesthetic to the music (for example, a chord melody set to correspond to the main melody), and comprise a set of feature data (e.g., chrominance value data of the image) in the second melody as the sound intensity sequence, for further enhancing the transmission efficiency of data and the beauty of the music.

On the basis of any of the above possible embodiment, the step 101 of converting, by the first device, an image to be transmitted into a number of sets of feature data according to a preset conversion rule may specifically comprise the steps not shown in the drawings:

Step 101a: converting a gray-scale value sequence of the image to be transmitted into a first set of feature data and a second set of feature data, the first set of feature data consisting of a first gray-scale value in the gray-scale value sequence and all of the gray-scale values different from the previous gray-scale value, and the second set of feature data consisting of the number of consecutive appearance of each gray-scale value of the first set of feature data at the corresponding position in the gray-scale value sequence;

Step 101b: converting a chrominance value sequence of the image to be transmitted into a third set of feature data, the third set of feature data being a chrominance value sequence of the image after size compression.

Accordingly, the step 203 of converting, by the second device, the number of sets of feature data into the image to be transmitted according to a rule corresponding to the preset conversion rule may specifically comprise the steps not shown in the drawings:

Step 203a: converting a first set of feature data and a second set of feature data among the number of sets of feature data into a gray-scale value sequence of the image to be transmitted, the first set of feature data consisting of a first gray-scale value in the gray-scale value sequence and all of the gray-scale values different from the previous gray-scale value, and the second set of feature data consisting of the number of consecutive appearance of each gray-scale value of the first set of feature data at the corresponding position in the gray-scale value sequence;

Step 203b: converting a third set of feature data among the number of sets of feature data into a chrominance value sequence of the image to be transmitted, the third set of feature data being a chrominance value sequence of the image after size compression.

For example, the gray-scale value sequence in the above-described step 101a may be 140, 140, 140, 39, 237, 237, 1, 1, 1, 1, 1, 1, 140, 140, so that the first gray-scale value in the gray-scale value sequence is 140, and all of the gray-scale values different from the previous gray-scale value in turn comprise 39, 237, 1, 140, whereby 140, 39, 237, 1, 140 form the first set of feature data. Correspondingly, the number of consecutive appearances of 140, 39, 237, 1, 140 at the corresponding positions in the gray-scale value sequence are respectively 3, 1, 2, 6, 2, whereby 3, 1, 2, 6, 2 form the second set of feature data. Accordingly, in the above-described step 203a, the gray-scale value sequence 140, 140, 140, 39, 237, 237, 1, 1, 1, 1, 1, 1, 140, 140 may be obtained through the conversion of the first set of feature data 140, 39, 237, 1, 140 and the second set of feature data 3, 1, 2, 6, 2.

Meanwhile, for the third set of feature data in the above-described step 101b, the original image may be first divided into an image composed of several 2×2 pixel blocks, and the average of chrominance values of each 2×2 pixel block is calculated, so as to form the third set of feature data (equivalent to performing size compression on the original image). In the step 203b, the average of chrominance values of each 2×2 pixel block may be directly used as the chrominance value of each pixel, and although part of chrominance value data of the original image are lost, the amount of data transmission may be reduced and the transmission speed may be enhanced. Or, in the above-described step 101b, lossless compression may be performed on the chrominance values of the original image using a certain compression algorithm, to form the third set of feature data, so that in the above-described step 203b, the corresponding decompression algorithm may be used to obtain the chrominance values of the original image from the third set of feature data.

It may be understood that the embodiment of the present disclosure employs the first and second sets of feature data to characterize the gray-scale value sequence of the image to be transmitted, whereby it is possible to have a good data compression effect on the image having contents repeated to a high degree. The embodiment of the present disclosure employs the third set of feature data to characterize the chrominance value sequence of the image to be transmitted, whereby it is possible to have a good data compression effect on the image with even color.

Figure 5:
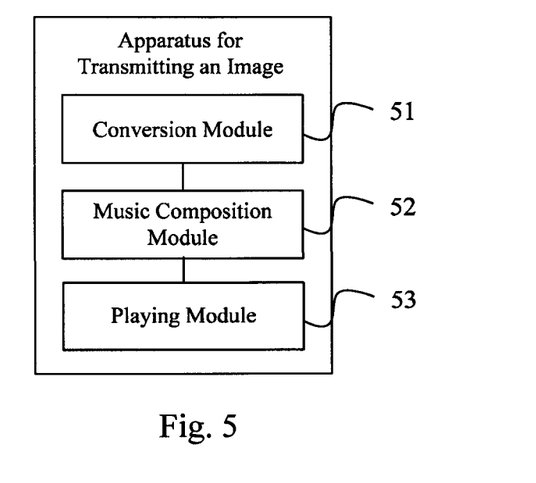
FIG. 5 is a block diagram of the structure of an apparatus for transmitting an image in an embodiment of the present disclosure.

FIG. 5 is a block diagram of the structure of an apparatus for transmitting an image in an embodiment of the present disclosure. Based on the same concept, the embodiment of the present disclosure provides an apparatus for transmitting an image. Referring to FIG. 5, the apparatus comprises:

a conversion module 51 for converting an image to be transmitted into a number of sets of feature data according to a preset conversion rule;

a music composition module 52 for performing music composition according to preset music composition rules to obtain a music in line with musical tone rules through making each set of the number of sets of feature data obtained by the conversion module 51 correspond to one musical element;

a playing module 53 for playing the music obtained by the music composition module 52 to a second device. According to an embodiment of the present disclosure, the second device may extract the number of sets of feature data from the musical elements of the music according to the preset music composition rules, and convert the number of sets of feature data into the image to be transmitted according to a rule corresponding to the preset conversion rule.

As can be seen, the conversion module 51, the music composition module 52 and the playing module 53 may be respectively used to perform the step 101, step 102 and step 103 in FIG. 1. Those skilled in the art can infer the structures they may have according to functions, which will not be discussed here.

Similarly, the embodiment of the disclosure can implement the image transmission between the first and second devices by playing and listening to the music, whereby not only users may intuitively feel the entire transmission process, but also a variety of different aesthetic music can be generated according to different images transmitted. This is very practical for scenarios not demanding high data speed, such as entertainment, education, advertisement and other specific scene.

On the basis of the apparatus for transmitting an image shown in FIG. 5, the music composition module 52 may specifically comprise the following structures not shown in the drawings:

a first conversion unit 52a for converting a first set of feature data among the number of sets of feature data obtained by the conversion module 51 into a first data sequence according to a first preset rule among the preset music composition rules, each data in the first data sequence being a ternary number having preset digits;

a second conversion unit 52b for converting a second set of feature data among the number of sets of feature data obtained by the conversion module 51 into a sound length sequence according to a second preset rule among the preset music composition rules;

a music composition unit 52c for making three digits of the ternary number respectively correspond to one of contrabass, bass and treble of a triad, and filling the first data sequence obtained by the first conversion unit 52a in combination with the sound length sequence obtained by the second conversion unit 52b as notes in a music score having preset chord progression in the preset music composition rules, according to a third preset rule among the preset music composition rules, to form a first melody of the music corresponding to a first preset tone in the preset music composition rules.

Where different feature data corresponding to the same ternary number may be distinguished by respectively performing permutations and combinations of rise, fall or no-change on three notes corresponding to the ternary number in the music.

Further, the music composition module 52 may further comprise the following structures not shown in the drawings:

a third conversion unit 52d for converting a third set of feature data among the number of sets of feature data obtained by the conversion module 51 into a sound intensity sequence according to a fourth preset rule among the preset music composition rules;

a generating unit 52e for generating a second melody matching the first melody according to a fifth preset rule among the preset music composition rules, the sound intensity of each note in the second melody being set according to the sound intensity sequence obtained by the third conversion unit 52d, and the second melody corresponding to a second preset tone in the preset music composition rules.

On the other hand, on the basis of the apparatus for transmitting an image shown in FIG. 5, the conversion module 51 may specifically comprise the following structures not shown in the drawings:

a fourth conversion unit 51a for converting a gray-scale value sequence of the image to be transmitted into a first set of feature data and a second set of feature data, the first set of feature data consisting of a first gray-scale value in the gray-scale value sequence and all of the gray-scale values different from the previous gray-scale value, the second set of feature data consisting of the number of consecutive appearance of each gray-scale value of the first set of feature data at the corresponding position in the gray-scale value sequence;

a fifth conversion unit 51b for converting the chrominance value sequence of the image to be transmitted into a third set of feature data, the third set of feature data being a chrominance value sequence of the image after size compression.

As can be seen, each of the units or modules abovementioned corresponds to one step in the embodiment of the method for transmitting an image, and hence can solve the same technical problem to achieve the corresponding technical effects, whereby it is not discussed here.

Figure 6:
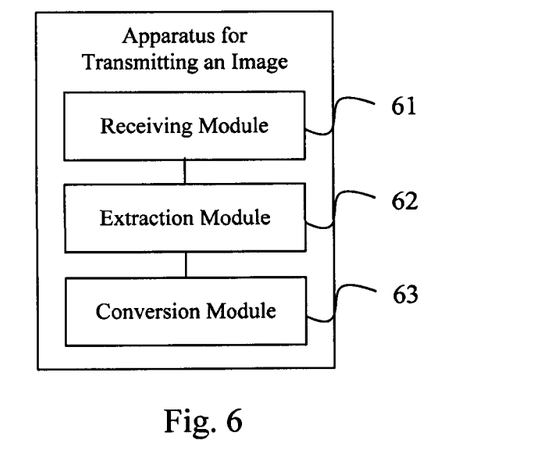
FIG. 6 is a block diagram of the structure of an apparatus for transmitting an image in another embodiment of the present disclosure.

FIG. 6 is a block diagram of the structure of an apparatus for transmitting an image in another embodiment of the present disclosure. Based on the same concept, the embodiment of the present disclosure provides an apparatus for transmitting an image. Referring to FIG. 6, the apparatus comprises:

a receiving module 61 for receiving a music played by a first device, the music being the music obtained in line with musical tone rules after the first device converts the image to be transmitted into the number of sets of feature data according to the preset conversion rule and performs music composition according to preset music composition rules through making each set of the number of sets of feature data correspond to one musical element;

an extraction module 62 for extracting the number of sets of feature data from musical elements of the music obtained by the receiving module 61 according to the preset music composition rules;

a conversion module 63 for converting the number of sets of feature data obtained by the extraction module 62 into the image to be transmitted according to a rule corresponding to the preset conversion rule.

As can be seen, the receiving module 61, the extraction module 62 and the conversion module 63 may be respectively used to perform the step 201, step 202 and step 203 in FIG. 2. Those skilled in the art can infer the structures they may have according to functions, which will not be discussed here.

Similarly, the embodiment of the disclosure can implement the image transmission between the first and second devices by playing and listening to the music, whereby not only users may intuitively feel the entire transmission process, but also a variety of different aesthetic music can be generated according to different images transmitted. This is very practical for scenarios not demanding high data speed, such as entertainment, education, advertisement and other specific scene.

On the basis of the apparatus for transmitting an image shown in FIG. 6, the extraction module 62 may specifically comprise the following structures not shown in the drawings:

a first extraction unit 62a for extracting a first melody corresponding to a first preset tone from the music obtained by the receiving module 61 according to features of the first preset tone in the preset music composition rules;

an obtaining unit 62b for obtaining a first data sequence and a sound length sequence from the tones in the first melody obtained by the first extraction unit 62a according to a third preset rule among the preset music composition rules, in combination with a music score having preset chord progression in the preset music composition rules; each data in the first data sequence being a ternary number having preset digits, and three digits of the ternary number respectively corresponding to one of contrabass, bass and treble of a triad;

a first conversion unit 62c for converting the first data sequence obtained by the obtaining unit 62b into a first set of feature data among the number of sets of feature data according to a first preset rule among the preset music composition rules, and converting the sound length sequence obtained by the obtaining unit 62b into a second set of feature data among the number of sets of feature data according to a second preset rule among the preset music composition rules.

Where different feature data corresponding to the same ternary number may be distinguished by respectively performing permutations and combinations of rise, fall or no-change on three notes corresponding to the ternary number in the music.

Further, the above extraction module 62 may specifically comprise the following structures not shown in the drawings:

a second extraction unit 62d for extracting a second melody corresponding to a second preset tone from the music obtained by the receiving module 61 according to features of the second preset tone in the preset music composition rules, the second melody matching the first melody;

a third extraction unit 62e for extracting a sound intensity sequence from the sound intensity of each note in the second melody obtained by the second extraction unit 62d according to a fifth preset rule in the preset music composition rules;

a second conversion unit 62f for converting the sound intensity sequence obtained by the third extraction unit 62e into a third set of feature data among the number of sets of feature data according to a fourth preset rule among the preset music composition rules.

On the other hand, on the basis of the apparatus for transmitting an image shown in FIG. 6, the conversion module 63 may specifically comprise the following structures not shown in the drawings:

a third conversion unit 63a for converting a first set of feature data and a second set of feature data among the number of sets of feature data obtained by the extraction module 62 into a gray-scale value sequence of the image to be transmitted, the first set of feature data consisting of a first gray-scale value in the gray-scale value sequence and all of the gray-scale values different from the previous gray-scale value, the second set of feature data consisting of the number of consecutive appearance of each gray-scale value of the first set of feature data at the corresponding position in the gray-scale value sequence;

a fourth conversion unit 63b for converting a third set of feature data among the number of sets of feature data obtained by the extraction module 62 into a chrominance value sequence of the image to be transmitted, the third set of feature data being a chrominance value sequence of the image after size compression.

As can be seen, each of the units or modules abovementioned corresponds to one step in the embodiment of the method for transmitting an image, and hence can solve the same technical problem to achieve the corresponding technical effects, whereby it is not discussed here.

On the basis of any of the apparatuses, consistent with the description above, the musical elements of the music in the embodiments of the present disclosure may comprise at least one of: a pitch sequence of sound having any one tone in the music; a sequence consisting of length of each pitch in the pitch sequence of sound having any one tone in the music; a sequence consisting of strength of each pitch in the pitch sequence of sound having any one tone in the music. Moreover, a data starting point and/or intermediate point and/or ending point of any set of the feature data may be identified by at least one preset sound feature in the music. Further, the at least one preset sound feature comprises at least one of: crescendo, decrescendo, non-chord tone, ornament, percussion sound, and a predetermined melody.

Based on the same concept, the present embodiment of the disclosure provides a terminal device, the terminal device comprising: any of the abovementioned apparatus for transmitting an image, which may play the music to the second device, and/or, any of the abovementioned apparatus for transmitting an image, which may receive the music played by the first device.

It should be noted that, the terminal device in the embodiment of the present disclosure may be any device comprising a storage medium and a processor, for example, a personal computer (such as desktop, laptop, tablet, one machine), smart phone, e-book, smart TV, digital photo frame, smart navigator, and the like. Since the terminal device comprise the above-described apparatus for transmitting an image, the technical effect of using the music to transmit an image can also be achieved.

The description of the present disclosure illustrates numerous specific details. However, it can be understood that the embodiments of the present disclosure may be practiced without these specific details. In some instances, well-known methods, structures and techniques are not shown in detail, so as not to obscure the understanding of this description.

Similarly, it should be understood that in order to simplify the present disclosure and help understanding of one or more of various aspects, in the description of exemplary embodiments of the present disclosure, the various features of the present disclosure are sometimes grouped together into a single embodiment, figure, or description thereof. However, it should not be construed that the method of the present disclosure reflects the intention that the present disclosure as sought for protection in the claims requires more features than explicitly disclosed in each claim. More specifically, as reflected in the following claims, the aspects may have features less than all features of a single embodiment disclosed in the foregoing. Thus, the claims following the requirements of specific embodiments are hereby expressly incorporated into the specific embodiments, wherein each claim itself is taken as a separate embodiment of the present disclosure.

It should be noted that the above embodiments are meant to illustrate the present disclosure but not to limit the present disclosure, and that those skilled in the art may devise alternative embodiments without departing from the scope of the appended claims. In the claims, any reference sign within parentheses should not be constructed to limit the claims. The word "comprising" does not exclude elements or steps not listed in the claims. The word "a" or "an" located before an element does not exclude a number of such elements. The present disclosure may be implemented by means of hardware comprising a number of distinct elements and by means of a computer suitably programmed. In unit claims listing a number of means, some of those means may be specifically embodied by the same hardware. The use of words, first, second, and third, etc. does not denote any order. These words can be interpreted as names.

Finally, it should be noted that the above embodiments are merely intended to illustrate the present disclosure, but not to limit the present disclosure; although the present disclosure has been described in detail with reference to the foregoing embodiments, those skilled in the art will appreciate that they still may modify the foregoing embodiments, or make equivalent replacements with part or all of the technical features; and such modifications or replacements do not depart from the range of various embodiments of the disclosure, and should be encompassed by the scope of the claims and the description of the present disclosure.

What is claimed is:

1. A method for transmitting an image, comprising:
   converting, by a first device, an image to be transmitted into a number of sets of feature data according to a preset conversion rule;
   performing, by the first device by making each set of the number of sets of feature data correspond to one musical element, music composition according to preset music composition rules to obtain a music in accordance with musical tone rules; and
   playing, by the first device, the music to a second device, wherein the musical elements of the music comprise at least one of:
     a pitch sequence of sound having any one tone in the music;
     a sequence consisting of a length of each pitch in the pitch sequence of sound having the any one tone in the music; and
     a sequence consisting of a strength of each pitch in the pitch sequence of sound having the any one tone in the music,
   wherein the step of performing, by the first device, music composition according to preset music composition rules comprises:
     converting a first set of feature data among the number of sets of feature data into a first data sequence according to a first preset rule among the preset music composition rules, each data in the first data sequence being a ternary number having preset digits;
     converting a second set of feature data among the number of sets of feature data into a sound length sequence according to a second preset rule among the preset music composition rules; and
     making three digits of the ternary number respectively correspond to one of contrabass, bass, and treble of a triad, and filling the first data sequence in combination with the sound length sequence as notes in a music score having a preset chord progression in the preset music composition rules, according to a third preset rule among the preset music composition rules, to form a first melody corresponding to a first preset tone in the preset music composition rules.

2. The method according to claim 1, wherein at least one of a data starting point, a data intermediate point and a data ending point of any set of the feature data is identified by at least one preset sound feature in the music.

3. The method according to claim 2, wherein the at least one preset sound feature comprises at least one of: crescendo, decrescendo, non-chord tone, ornament, percussion sound, and a predetermined melody.

4. The method according to claim 1, wherein different feature data corresponding to the same ternary number are distinguished by respectively performing permutations and combinations of at least one of rise, fall and no-change on three notes corresponding to the ternary number in the music.

5. The method according to claim 1, wherein the step of performing, by the first device, music composition according to preset music composition rules further comprises:
   converting a third set of feature data among the number of sets of feature data into a sound intensity sequence according to a fourth preset rule among the preset music composition rules; and
   generating a second melody matching the first melody according to a fifth preset rule among the preset music composition rules, the sound intensity of each note in the second melody being set according to the sound intensity sequence, and the second melody corresponding to a second preset tone in the preset music composition rules.

6. The method according to claim 1, wherein the step of converting by the first device, an image to be transmitted into a number of sets of feature data according to a preset conversion rule comprises:
   converting a gray-scale value sequence of the image to be transmitted into a first set of feature data and a second set of feature data, the first set of feature data comprising a first gray-scale value in the gray-scale value sequence and all of the gray-scale values different from the previous gray-scale value, the second set of feature data comprising the number of consecutive appearance of each gray-scale value of the first set of feature data at the corresponding position in the gray-scale value sequence; and
   converting a chrominance value sequence of the image to be transmitted into a third set of feature data, the third set of feature data being a chrominance value sequence of the image after size compression.

7. A method for receiving an image, comprising:
   receiving, by a second device, a music played by a first device, wherein the music in accordance with musical tone rules is obtained by the first device through music composition according to preset music composition rules by making each set of a number of sets of feature data correspond to one musical element, and wherein the number of sets of feature data are converted according to a preset conversion rule by the first device from an image to be transmitted;
   extracting, by the second device, a number of sets of feature data from musical elements of the music in accordance with musical tone rules according to the preset music composition rules, wherein each set of the number of sets of feature data corresponds to one musical element; and converting, by the second device, the extracted number of sets of feature data into the corresponding image according to a rule corresponding to the preset conversion rule, wherein the musical elements of the music comprise at least one of:
- a pitch sequence of sound having any one tone in the music;
- a sequence consisting of a length of each pitch in the pitch sequence of sound having the any one tone in the music; and
- a sequence consisting of strength of each pitch in the pitch sequence of sound having the any one tone in the music, wherein the step of extracting, by the second device, the number of sets of feature data from musical elements of the music according to the preset music composition rules comprises:
- extracting a first melody corresponding to a first preset tone from the music according to features of the first preset tone in the preset music composition rules;
- obtaining a first data sequence and a sound length sequence from tones in the first melody according to a third preset rule among the preset music composition rules, in combination with a music score having a preset chord progression in the preset music composition rules, each data in the first data sequence being a ternary number having preset digits, and three digits of the ternary number respectively corresponding to one of contrabass, bass, and treble of a triad; and
- converting the first data sequence into a first set of feature data among the number of sets of feature data according to a first preset rule among the preset music composition rules, and converting the sound length sequence into a second set of feature data among the number of sets of feature data according to a second preset rule among the preset music composition rules.

8. The method according to claim 7, wherein at least one of a data starting point, a data intermediate point and a data ending point of any set of the feature data is identified by at least one preset sound feature in the music.

9. The method according to claim 8, wherein the at least one preset sound feature comprises at least one of: crescendo, decrescendo, non-chord tone, ornament, percussion sound, and a predetermined melody.

10. The method according to claim 7, wherein different feature data corresponding to the same ternary number are distinguished by respectively performing permutations and combinations of at least one of rise, fall and no-change on three notes corresponding to the ternary number in the music.

11. The method according to claim 7, wherein the step of extracting, by the second device, the number of sets of feature data from the musical elements of the music according to the preset music composition rules further comprises:
- extracting a second melody corresponding to a second preset tone from the music according to features of the second preset tone in the preset music composition rules, the second melody matching the first melody;
- extracting a sound intensity sequence from the sound intensity of each note in the second melody according to a fifth preset rule in the preset music composition rules; and
- converting the sound intensity sequence into a third set of feature data among the number of sets of feature data according to a fourth preset rule among the preset music composition rules.

12. The method according to claim 7, wherein the step of converting, by the second device, the number of sets of feature data into the corresponding image according to a rule corresponding to the preset conversion rule comprises:
- converting a first set of feature data and a second set of feature data among the number of sets of feature data into a gray-scale value sequence of the corresponding image, the first set of feature data comprising a first gray-scale value in the gray-scale value sequence and all of the gray-scale values different from the previous gray-scale value, the second set of feature data comprising the number of consecutive appearance of each gray-scale value of the first set of feature data at the corresponding position in the gray-scale value sequence; and
- converting a third set of feature data among the number of sets of feature data into a chrominance value sequence of the corresponding image, the third set of feature data being a chrominance value sequence of the image after size compression.

13. An apparatus for transmitting an image, comprising:
- a conversion module for converting an image to be transmitted into a number of sets of feature data according to a preset conversion rule;
- a music composition module for performing, by making each set of the number of sets of feature data obtained by the conversion module correspond to one musical element, music composition according to preset music composition rules to obtain music in accordance with musical tone rules; and
- a playing module for playing the music obtained by the music composition module to a second device, wherein the musical elements of the music comprise at least one of:
  - a pitch sequence of sound having any one tone in the music;
  - a sequence consisting of a length of each pitch in the pitch sequence of sound having the any one tone in the music; and
  - a sequence consisting of a strength of each pitch in the pitch sequence of sound having the any one tone in the music, wherein the music composition is performed according to the preset music composition rules by:
- converting a first set of feature data among the number of sets of feature data into a first data sequence according to a first preset rule among the preset music composition rules, each data in the first data sequence being a ternary number having preset digits;
- converting a second set of feature data among the number of sets of feature data into a sound length sequence according to a second preset rule among the preset music composition rules; and
- making three digits of the ternary number respectively correspond to one of contrabass, bass, and treble of a triad, and filling the first data sequence in combination with the sound length sequence as notes in a music score having a preset chord progression in the preset music composition rules, according to a third preset rule among the preset music composition rules, to form a first melody corresponding to a first preset tone in the preset music composition rules.

14. An apparatus for receiving an image, the apparatus comprising:
  a receiving module for receiving a music played by a first device, wherein the music in accordance with musical tone rules is obtained by the first device through music composition according to preset music composition rules by making each set of a number of sets of feature data correspond to one musical element, and wherein the number of sets of feature data are converted according to a preset conversion rule by the first device from an image to be transmitted;
  an extraction module for extracting a number of sets of feature data from musical elements of the music in accordance with musical tone rules obtained by the receiving module, according to the preset music composition rules, wherein each set of the number of sets of feature data corresponds to one musical element; and
  a conversion module for converting the extracted number of sets of feature data obtained by the extraction module into the corresponding image according to a rule corresponding to the preset conversion rule, wherein the musical elements of the music comprise at least one of:
    a pitch sequence of sound having any one tone in the music;
    a sequence consisting of a length of each pitch in the pitch sequence of sound having the any one tone in the music; and
    a sequence consisting of strength of each pitch in the pitch sequence of sound having the any one tone in the music,
  wherein the number of sets of feature data is extracted from the musical elements of the music according to the preset music composition rules by:
    extracting a first melody corresponding to a first preset tone from the music according to features of the first preset tone in the preset music composition rules;
    obtaining a first data sequence and a sound length sequence from tones in the first melody according to a third preset rule among the preset music composition rules, in combination with a music score having a preset chord progression in the preset music composition rules, each data in the first data sequence being a ternary number having preset digits, and three digits of the ternary number respectively corresponding to one of contrabass, bass, and treble of a triad; and
    converting the first data sequence into a first set of feature data among the number of sets of feature data according to a first preset rule among the preset music composition rules, and converting the sound length sequence into a second set of feature data among the number of sets of feature data according to a second preset rule among the preset music composition rules.

* * * * *